(12) United States Patent
Reardon et al.

(10) Patent No.: US 11,689,551 B2
(45) Date of Patent: Jun. 27, 2023

(54) AUTOMATIC IDENTIFICATION OF APPLICATIONS THAT CIRCUMVENT PERMISSIONS AND/OR OBFUSCATE DATA FLOWS

(71) Applicant: AppCensus, Inc., El Cerrito, CA (US)

(72) Inventors: Joel Reardon, Calgary (CA); Narseo Vallina-Rodriguez, Madrid (ES); Nathaniel Good, Albany, CA (US); Serge Egelman, San Francisco, CA (US)

(73) Assignee: AppCensus, Inc., El Cerrito, CA (US)

( * ) Notice: Subject to any disclaimer, the term of this patent is extended or adjusted under 35 U.S.C. 154(b) by 244 days.

(21) Appl. No.: 16/914,039

(22) Filed: Jun. 26, 2020

(65) Prior Publication Data

US 2021/0409432 A1 Dec. 30, 2021

(51) Int. Cl.
*H04L 9/40* (2022.01)
(52) U.S. Cl.
CPC ................. *H04L 63/1425* (2013.01)
(58) Field of Classification Search
CPC . H04L 9/3247; H04L 9/0894; H04L 2209/38; H04L 63/101; H04L 63/1416; G06F 16/24573; G06F 21/10; G06F 21/121; G06F 21/577; G06F 21/60
See application file for complete search history.

(56) References Cited

U.S. PATENT DOCUMENTS

| | | | | |
|---|---|---|---|---|
| 10,341,215 B2* | 7/2019 | Ramanath | ............... | H04L 43/50 |
| 10,521,613 B1* | 12/2019 | Gonzalez | .............. | G06F 21/552 |
| 10,607,011 B1* | 3/2020 | Orhan | ................... | G06F 21/566 |
| 2011/0083187 A1* | 4/2011 | Malanov | ............... | G06F 21/577 |
| | | | | 707/693 |
| 2013/0305369 A1* | 11/2013 | Karta | .................. | H04L 63/1416 |
| | | | | 726/23 |
| 2015/0326586 A1* | 11/2015 | Khesin | .................. | G06F 21/568 |
| | | | | 726/1 |
| 2017/0099312 A1* | 4/2017 | Ganame | ................. | G06N 20/00 |
| 2018/0019932 A1* | 1/2018 | Giura | .................. | H04L 63/1425 |
| 2019/0042713 A1* | 2/2019 | Porcelli | ................. | G06F 21/121 |

(Continued)

OTHER PUBLICATIONS

Sbirlea et al., "Automatic detection of inter-application permission leaks in Android applications," IBM Journal of Research and Development Year: 2013 | vol. 57, Issue: 6 | Journal Article | Publisher: IBM.*

(Continued)

*Primary Examiner* — Roderick Tolentino
(74) *Attorney, Agent, or Firm* — Nicholson, De Vos, Webster & Elliott, LLP (57) ABSTRACT

A method for automatically identifying applications that circumvent permissions. The method includes logging network traffic transmitted by one or more computing devices while the one or more computing devices execute one or more applications, identifying, based on analyzing the logged network traffic and permissions granted to the one or more applications, those of the one or more applications that caused permission-protected data to be transmitted without having permission to access that data as circumventing permissions, and generating a report indicating the applications that were identified as circumventing permissions.

20 Claims, 5 Drawing Sheets

(56) References Cited

U.S. PATENT DOCUMENTS

2020/0082081 A1* 3/2020 Sarin .................... H04W 12/08

OTHER PUBLICATIONS

Shi et al., "A Mechanism to Resolve the Unauthorized Access Vulnerability Caused by Permission Delegation in Blockchain-Based Access Control," IEEE Access Year: 2020 | vol. 8 | Journal Article | Publisher: IEEE.*

Reardon, et al., "50 Ways to Leak Your Data: An Exploration of Apps' Circumvention of the Android Permissions System," Proceedings of the 28th USENIX Conference on Security Symposium (SEC'19), Aug. 2019, pp. 603-620.

Reyes, et al., "'Won't Somebody Think of the Children?' Examining COPPA Compliance at Scale," Proceedings on Privacy Enhancing Technologies (PoPETS), Jun. 2018 (3), pp. 63-83.

* cited by examiner

AUTOMATIC IDENTIFICATION OF APPLICATIONS THAT CIRCUMVENT PERMISSIONS AND/OR OBFUSCATE DATA FLOWS

TECHNICAL FIELD

Embodiments of the invention relate to the field of data privacy, and more specifically, to automatically identifying applications that circumvent access controls/permissions.

BACKGROUND

Smartphones are used as general-purpose computers and therefore have access to a great deal of sensitive system resources (e.g., sensors such as the camera, microphone, or global positioning system (GPS)), private data from the end user (e.g., user email or contacts list), and various persistent identifiers (e.g., international mobile equipment identity (IMEI)). It is crucial to protect this data from unauthorized access. Modern smartphone platforms such as Android® implement a permission-based model to regulate access to these sensitive resources and data by third-party apps. With the permission-based model, app developers must explicitly request permission to access sensitive resources (e.g., in an Android® manifest file). The permission-based model is intended to give users control in deciding which apps can access which resources and data.

In practice, security mechanisms can often be circumvented. Side channels and covert channels are two common avenues to circumvent a security mechanism. These channels provide an alternate means to access the protected resource that is not audited by the security mechanism, thus leaving the resource unprotected.

A side channel is a communication path that allows a party to obtain privileged information without relevant permission checks occurring. This can be due to nonconventional unprivileged functions or features, as well as ersatz versions of the same information being available without being protected by the same permission. An example of a side channel attack is the timing attack to exfiltrate an encryption key from secure storage. The system under attack is an algorithm that performs computation with the key and unintentionally leaks timing information (i.e., how long it runs) that reveals critical information about the key. Side channels are typically an unintentional consequence of a complicated system ("backdoors" are intentionally-created side channels that are meant to be obscure). In some mobile operating systems, a large and complicated application programming interface (API) results in the same data appearing in different locations, each governed by different access control mechanisms. When one API is protected with permissions, another unprotected method may be used to obtain the same data or an ersatz version of it. The United States Federal Trade Commission (FTC) has fined mobile developers and third-party libraries for exploiting side channels to obtain the media access control (MAC) address of the WiFi access point to infer the user's location.

A covert channel is a communication path between two parties that allow them to transfer information that the relevant security enforcement mechanism deems the recipient unauthorized to receive. For example, assume that "AliceApp" has been granted permission through the mobile operating system API to access the phone's IMEI, but "BobApp" has been denied access to that same data. A covert channel is created when "AliceApp" legitimately reads the IMEI and then gives it to "BobApp," even though "BobApp" has already been denied access to this same data when requesting it through the proper permission-protected APIs. It has been found that various covert channels have been proposed to enable communication between apps (e.g., including exotic mediums such as ultrasonic audio beacons and vibrations). Apps can also communicate using an external network server to exchange information when no other opportunity exists. Both side channels and covert channels pose threats to user privacy.

Such deceptive practices allow developers to access private data without consent, undermining user privacy and giving rise to both legal and ethical concerns. Data protection legislation around the world—including the General Data Protection Regulation (GDPR) in Europe, the California Consumer Privacy Act (CCPA) and consumer protection laws, such as the Federal Trade Commission Act—enforce transparency on the data collection, processing, and sharing practices of mobile applications. With increased regulatory attention to data privacy and issues surrounding user consent, it is imperative to understand the effectiveness (and limitations) of the permission system and whether it is being circumvented.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Modern smartphone platforms such as Android® implement a permission-based model to regulate access to these sensitive resources and data by third-party applications. The Android® permissions system has evolved over the years from an ask-on-install approach to an ask-on-first-use approach. While this change impacts when permissions are granted and how users can use contextual information to reason about the appropriateness of a permission request, the backend enforcement mechanisms have remained largely unchanged.

Modern mobile operating systems (e.g., Android®) typically have permission systems that are based on the security principle of least privilege. That is, an app should only have the minimum capabilities/permissions it needs to perform its task. This security design principle implies that if an app acts maliciously, the damage will be limited. App developers must declare the permissions that their apps need beforehand, and the user is given an opportunity to review them and decide whether to install the app. Oftentimes, however, mobile operating systems do not judge whether the set of requested permissions are all strictly necessary for the app to function. Developers are free to request more permissions than they actually need and users are expected to judge if they are reasonable.

The Android® permission model has two important aspects: obtaining user consent before an app is able to access any of its requested permission-protected resources, and then ensuring that the app cannot access resources for which the user has not granted consent. When an app requests a permission-protected resource, the resource manager (e.g., LocationManager, WiFiManager, etc.) contacts the ActivityServiceManager, which is the reference monitor in Android®. The resource request originates from the sandboxed app, and the final verification happens inside the Android® platform code. The platform is a Java operating system that runs in system space and acts as an interface for a customized Linux kernel, though apps can interact with the kernel directly as well. For some permission-protected resources, such as network sockets, the reference monitor is the kernel, and the request for such resources bypasses the platform framework and directly contacts the kernel.

Figure 3A:
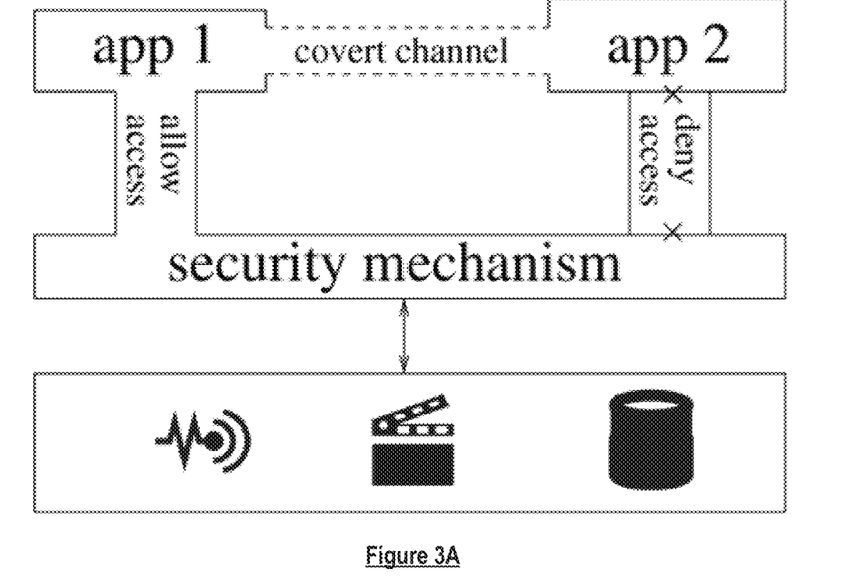
FIG. 3A is a diagram illustrating a covert channel, according to some embodiments.
Figure 3B:
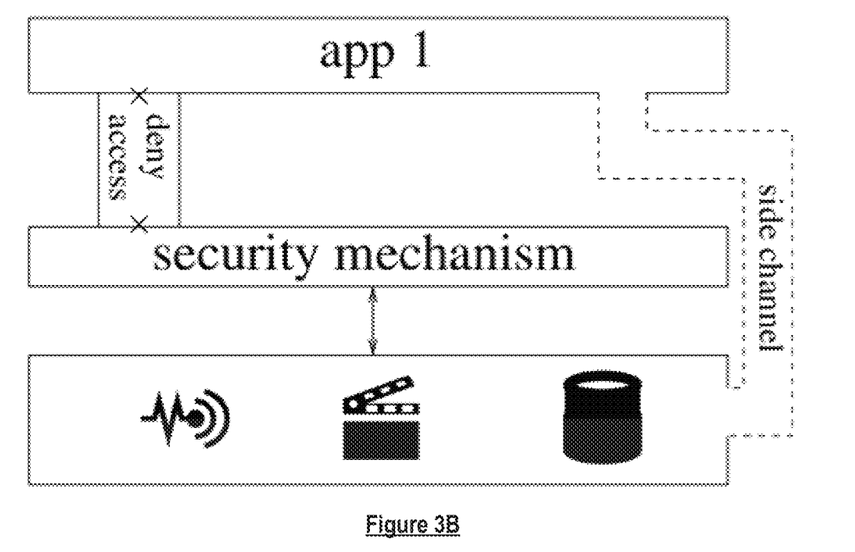
FIG. 3B is a diagram illustrating a side channel, according to some embodiments.

The Android® permissions system serves an important purpose: to protect users' privacy and sensitive system resources from deceptive, malicious, and abusive actors. At the very least, if a user denies an app a permission, then that app should not be able to access data protected by that permission. In practice, however, this is not always the case. Apps can circumvent the Android® permission model in different ways, including by the use of side channels and covert channels (e.g., which are illustrated in FIG. 3A and FIG. 3B, respectively). The use of covert channels and side channels is particularly troublesome as their usage indicates deceptive practices that might mislead even diligent users, while underscoring a security vulnerability in the operating system.

Embodiments disclosed herein provide techniques for automatically identifying applications that circumvent permissions. An embodiment is a method for automatically identifying applications that circumvent permissions. The method includes logging network traffic transmitted by one or more computing devices while the one or more computing devices execute one or more applications, identifying, based on analyzing the logged network traffic and permissions granted to the one or more applications, those of the one or more applications that caused permission-protected data to be transmitted without having permission to access that data as circumventing permissions, and generating a report indicating the applications that were identified as circumventing permissions. Embodiments are further described below with reference to the accompanying drawings.

Figure 1:
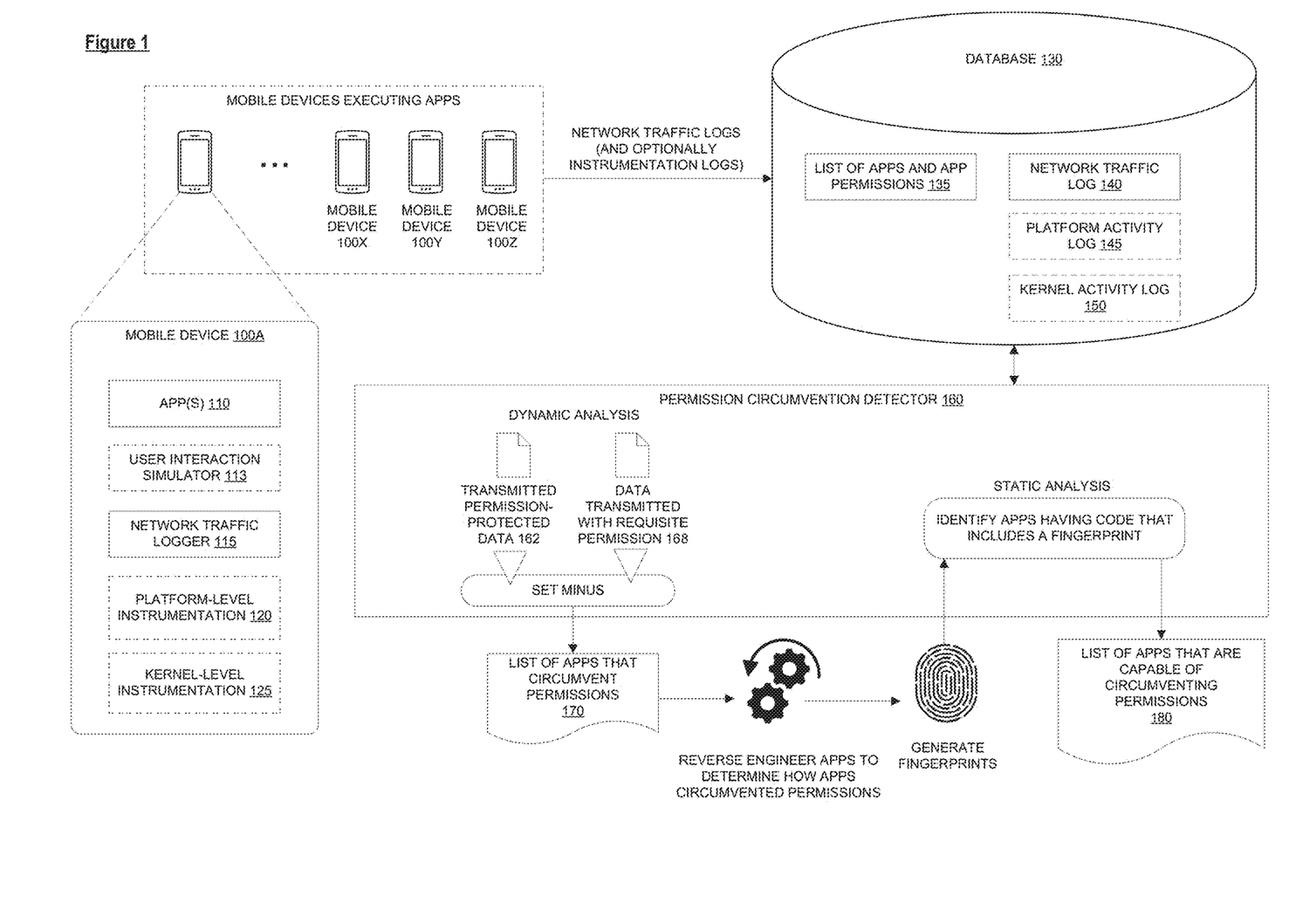
FIG. 1 is a block diagram illustrating a system for identifying apps that circumvent permissions, according to some embodiments.

FIG. 1 is a block diagram illustrating a system for identifying apps that circumvent permissions, according to some embodiments. As shown in the diagram, the system includes a set of mobile devices 100A-Z executing mobile applications ("apps") that are to be tested for permission circumvention, a database 130, and a permission circumvention detector 160. A mobile device 100 may be for example, a smartphone, a tablet, a smartwatch, or similar device on which apps can be installed. The apps that are to be tested for permission circumvention can be downloaded from an app store (e.g., Google Play® Store). The decision of which apps to test for permission circumvention is up to the system operator. In general, in order to perform a comprehensive analysis, it may be desirable to test the most popular apps across different categories, as well as various versions of those apps (e.g., because app developers may introduce new side channels and/or covert channels with new versions of their apps).

Mobile device 100A will now be described as a representative example of the mobile devices 100A-Z. As shown in the diagram, mobile device 100A may execute an app 110 that is to be tested for permission circumvention and a network traffic logger 115. Execution of an app may include execution of code that is specific to the app itself and may also include execution of code from software development kit (SDK) libraries embedded within the app. The SDK libraries may be provided by the mobile operating system itself (e.g., official Android® support libraries) or from third-party providers. App developers often integrate third-party libraries in their apps to perform tasks such as crash reporting, development support, analytics services, social-network integration, and advertising. By design, any third-party SDK bundled in an app typically inherits access to all of the permission-protected resources that the user grants to the app. For example, if an app has permission to access the device's location, then all third-party SDKs embedded in that app will have permission to access the device's location as well. While the diagram shows apps being executed on physical mobile devices 100, in some embodiments, one or more apps may be executed on virtual implementations of physical mobile devices.

In one embodiment, mobile device 100A includes a user interaction simulator 113. The user interaction simulator 113 may simulate user interaction on an app 110 being executed by mobile device 100A. For example, the user interaction simulator 113 may simulate taps, swipes, text input, and other more advanced types of user interactions (e.g., multi-touch gestures, shaking, audio input (through the built-in microphone), visual input (through the built-in camera), hovering finger over the touchscreen, etc.) on the executing app 110. In one embodiment, the user interaction simulator 113 (e.g., which may be a user interface (UI) fuzzer) injects a random or pseudo-random sequence of user interactions on the executing app 110. In one embodiment, the user interaction simulator 113 injects pre-recorded or pre-defined user interactions on the executing app 110. The user interaction simulator 113 may simulate user interaction on app 110 for a predefined period of time (e.g., ten minutes) for the purpose of testing app 110 for permission circumventions. The use of the user interaction simulator 113 allows for testing apps for permission circumventions at scale since it avoids the need for users to manually interact with each of the apps. However, it should be understood that in some embodiments user interactions can be provided manually/directly by a human user (or using other means by which interactions can be captured, generated, or supplied to an app). In one embodiment, user interactions are provided by a human user interacting remotely with app 110 via a tool that allows the user to remotely control app 110 (e.g., a remote desktop tool, a web page that allows for remotely controlling app 110 from the user's web browser, etc.).

The network traffic logger 115 may monitor and log network traffic (e.g., record information regarding the network traffic) transmitted by mobile device 100A while user interactions are being provided to the executing app 110 (e.g., simulated user interactions provided by the user interaction simulator 113 and/or actual human user interactions). In one embodiment, the network traffic logger 115 monitors and logs network traffic based on using a virtual private network (VPN) application programming interface (API) to redirect network traffic to a localhost service that inspects the network traffic in user space using deep packet inspection. The network traffic logger 115 may ascribe different network traffic to the originating app (the app that caused the network traffic to be transmitted) by mapping the app owning the socket to the user ID (UID) (or similar identifier) reported by the /proc filesystem. In one embodiment, the network traffic logger 115 performs transport layer security (TLS) interception by installing a root certificate in the system trusted certificate store. This may allow the network traffic logger 115 to decrypt TLS network traffic. While certain techniques are described above for intercepting and logging network traffic, it should be understood that network traffic can be intercepted and logged using other techniques.

Some apps and third-party libraries (e.g., SDKs) use obfuscation/encryption/encoding techniques to send data over the network with varying degrees of sophistication. For example, it has been found that some apps use gzip, base64, or ASCII-encoded hexadecimal encodings. Some apps apply advanced encryption standard (AES) encryption to its data before sending it over the network, often with hard-coded AES keys. Some apps/libraries generate random AES session keys to encrypt the data and then encrypt the session key with a hard-coded Rivest-Shamir-Adleman (RSA) public key, sending both the encrypted data and encrypted session key together. Some apps/libraries "encrypt" data by XOR-ing a keyword over the data in a Viginére-style cipher. In some cases, this is in addition to using standard encryption for the data and using TLS. Other approaches include applying various permutations of encoding strings, including applying different string permutations using a variety of encoding streams to obfuscate the traffic. The network traffic logger 115 may be configured to identify and deobfuscate/decrypt/decode various different types of obfuscation/encryptions/encodings occurring in network traffic and log the deobfuscated/decrypted/decoded network traffic. The network traffic logger 115 may be updated with new deobfuscation/decryption/decoding capabilities as the use of different obfuscation/encryption/encoding techniques are discovered.

In one embodiment, the mobile device 100A executes platform-level instrumentation 120 (e.g., instrumentation added to the Android® Marshmallow platform) to log information regarding resource accesses, when apps are installed and executed, network traffic, and/or other types of information available at the platform level. Since the platform-level instrumentation 120 is executed in the system space of the platform framework, an app cannot avoid it even if its code is obfuscated (e.g., for the purpose of disrupting static analysis). In a sense, the instrumented environment is a honeypot allowing apps to execute as their true selves.

In one embodiment, the mobile device 100A executes kernel-level instrumentation 125 (e.g., instrumentation added to a Linux kernel) to log information regarding resource accesses (e.g., when app 110 (or other apps executing on mobile device 100A) accesses the file system), when apps are installed and executed, network traffic, and/or other types of information available at the kernel level. For example, the kernel-level instrumentation 125 may record every time an app opens a file for reading or writing or unlinks a file. The kernel-level instrumentation 125 may log system calls to open files, which may include both regular files and special files, such as device and interface files, and the /proc filesystem, as a result of the "everything is a file" UNIX philosophy. In one embodiment, the kernel-level instrumentation 125 logs whenever an ioctl (which is a system call for device-specific input/output operations and other operations which cannot be expressed by regular system calls) is issued to the file system (e.g., because it has been found that apps can access permission-protected data using ioctl system calls). The kernel-level instrumentation may ascribe different accesses to the file system to the accessing app based on UID (or similar identifier) (e.g., Android® assigns a separate UID to each app).

After executing app 110 for a period of time (e.g., while user interactions are provided to app 110), mobile device 100A may store the resulting network traffic logs generated by the network traffic logger 115 in the database 130. In one embodiment, mobile device 100A also stores the logs generated by the platform-level instrumentation 120 and/or the logs generated by the kernel-level instrumentation in the database 130.

The other mobile devices (e.g., mobile devices 100B-Z) may execute similar components as mobile device 100A and operate similarly to mobile device 100A as described above except that they execute different apps (or different versions of the same apps) that are to be tested for permission circumvention. For example, the other mobile devices may execute their respective apps, log network traffic (and possibly generate instrumentation logs) while user interactions (e.g., simulated user interactions and/or human user interactions) are provided to their respective apps, and store the logs in the database 130. In one embodiment, user interactions are provided to the apps using a "crowdsourcing" approach where multiple different users each provide user interactions to respective apps remotely (e.g., using a remote desktop tool). As a result, the database 130 may store network traffic log 140, which is an aggregation of the network traffic logs generated by the mobile devices (thus the network traffic log 140 may include information regarding network traffic transmitted by the mobile devices while the mobile devices were executing their respective apps). In one embodiment, the database 130 may also store a platform activity log 145, which is an aggregation of the platform activity logs generated by the mobile devices and/or a kernel activity log 150, which is an aggregation of the kernel activity logs generated by the mobile devices. Thus, the system allows for automatically and comprehensively monitoring/logging the runtime behavior of a variety of apps at the network traffic, platform, and kernel levels.

As shown in the diagram, the database 130 may include a list of apps and app permissions 135. The list of apps and app permissions 135 may be the list of apps that are being tested for permission circumvention (e.g., the apps executed by mobile devices 100A-Z) and the permissions granted to each of the apps. The permissions granted to an app may include a READ_PHONE_STATE permission (e.g., which allows read only access to phone state, including the current cellular network information, the status of any ongoing calls), a ACCESS_NETWORK_STATE permission (e.g., which allows apps to access information about networks), a GET_ACCOUNTS permission (e.g., which allows access to the list of accounts in the Accounts Service), an ACCESS_WIFI_STATE permission (e.g., which allows apps to access information about Wi-Fi networks), an ACCESS_FINE_LOCATION permission (e.g., which allows an app to access precise location), and/or other types of permissions (e.g., BLUETOOTH permission (e.g., which allows apps to applications to connect to paired Bluetooth devices) and permission for accessing address book contacts and SMS messages).

As will be further described herein below, the permission circumvention detector 160 may detect when an app circumvents permissions. The permission circumvention detector 160 may be implemented using one or more computing devices. As shown in the diagram, the permission circumvention detector 160 is communicatively coupled to the database 130 and is able to access the data stored therein. The permission circumvention detector 160 may access and inspect the network traffic log 140 stored in the database 130 to determine the permission-protected data transmitted by mobile devices 100A-Z. As used herein, permission-protected data refers to data associated with a device (or a user of the device) that is only expected to be accessible with the requisite permission. Permission-protected data may include, but is not limited to, IMEI, device MAC address, email address, phone number, subscriber identification module (SIM) ID, router MAC address, router service set identifier (SSID), and geolocation (e.g., GPS coordinates). The permission circumvention detector 160 may have pre-knowledge of the permission-protected data associated with the mobile devices 100A-Z (e.g., the system operator may have provided this data to the system before beginning testing) and may search for this data in the network traffic log 140. In one embodiment, the permission circumvention detector 160 also searches for one or more hashes of the data (e.g., MD5 hash, Secure Hash Algorithm 1 (SHA1) hash, and/or Secure Hash Algorithm 256 (SHA256) hash). The permission-protected data found in the network traffic log 140 is represented in the diagram as "transmitted permission-protected data" 162.

Table I below lists various data types of permission-protected data, the permission that protects access to those data types (in Android®), and the purpose for which data of those data types is typically collected.

TABLE I

| Data Type | Permission | Purpose/Use |
| --- | --- | --- |
| IMEI | READ_PHONE_STATE | Persistent ID |
| Device MAC | ACCESS_NETWORK_STATE | Persistent ID |
| Email Address | GET_ACCOUNTS | Persistent ID |
| Phone Number | READ_PHONE_STATE | Persistent ID |
| SIM ID | READ_PHONE_STATE | Persistent ID |
| Router MAC | ACCESS_WIFI_STATE | Location Data |
| Router SSID | ACCESS_WIFI_STATE | Location Data |
| Geolocation | ACCESS_FINE_LOCATION | Location Data |

The data types mentioned in Table I above are of particular interest because they are sensitive/personal data that can be used by third parties (e.g., advertisers or analytics companies) as persistent identifiers for purposes of tracking users across different websites and apps and/or provide location information.

For example, the IMEI is a numerical value that identifies mobile phones uniquely. The IMEI has many valid and legitimate operational uses to identify devices in a cellular network, including the detection and blockage of stolen phones. The IMEI is also useful to online services as a persistent device identifier for tracking individual phones. The IMEI is a powerful identifier as it takes extraordinary efforts to change its value or even spoof it. In some jurisdictions, it is illegal to change the IMEI. Collection of the IMEI by third parties facilitates tracking in cases where the owner tries to protect their privacy by resetting other identifiers, such as the advertising ID.

The MAC address is an identifier that is uniquely assigned to the network interface controller (NIC) for establishing link-layer communications. The MAC address is useful to third parties as a hardware-based persistent identifier, similar to the IMEI. Also, router MAC addresses (e.g., the MAC address of the router that a mobile device 100 is connected with) can be used as a surrogate for location data (e.g., because routers are typically at fixed locations). Additionally, knowing the router MAC address allows one to determine which devices share Internet access, which may reveal personal relations by their respective owners, or enable cross-device tracking. Another type of data that can be used for consumer profiling and cross-device tracking is data regarding nearby Bluetooth devices, which is protected by the BLUETOOTH permission. While certain types of permission-protected data are mentioned above, it should be understood, that there can be other types of permission-protected data than those mentioned above.

The permission circumvention detector 160 may also determine, which of the permission-protected data 162 was transmitted with the requisite permission. The permission circumvention detector 160 may determine this, for example, by evaluating pieces of permission-protected data transmitted by the mobile devices 100 against the permissions granted to the app that caused that piece of data to be transmitted (e.g., the permissions may be obtained from the list of apps and app permissions 135 stored in the database 130). For example, if the network traffic log 140 indicates that the IMEI was caused to be transmitted by an app, then the permission circumvention detector 160 may determine whether that app has the READ_PHONE_STATE permission. If the app has the READ_PHONE_STATE permission, then the permission circumvention detector 160 may determine that the IMEI was transmitted with the requisite permission (and otherwise determine that the IMEI was transmitted without the requisite permission). The permission-protected data that was transmitted with the requisite permission is represented in the diagram as "data transmitted with requisite permission" 168.

The permission circumvention detector 160 may then determine the set of data that was transmitted without the requisite permission by taking the entire set of permission-protected data that was transmitted by the mobile devices (e.g., data 162 in the diagram) and excluding from it the set of permission-protected data that was transmitted with the requisite permission (e.g., data 168 in the diagram) (this is depicted in the diagram as performing a "set minus"). It should be understood that the "set minus" approach is just one approach to determine the set of data that was transmitted without the requisite permission, and that there are other ways to determine the set of data that was transmitted without the requisite permission other than using the "set minus" approach (e.g., the permission circumvention detector 160 may iterate through the permission-protected data 162 and extract the data for which the app that caused that data to be transmitted does not have the requisite permission to access that type of data). The data that was transmitted without the requisite permission may be referred to herein as "permission-circumvented data."

The permission circumvention detector 160 may then identify the apps that transmitted the permission-circumvented data, which are the apps that are considered as having circumvented permissions (e.g., because they caused permission-protected data to be transmitted without having the requisite permission to access that permission-protected data, which suggests the use of side channels and/or covert channels). The permission circumvention detector 160 may then generate a report of the list of apps that have been determined to circumvent permissions (e.g., list 170 shown in the diagram), which may be provided to the system operator. In one embodiment the report further indicates the type of data (and/or the actual data itself) that an app caused to be transmitted without having the requisite permission and/or the destination of the data (e.g., the IP address to which the data was transmitted). It should be noted that the permission circumvention detector 160 does not merely identify apps that are capable of circumventing permissions but performs dynamic analysis (e.g., based on actual execution of apps and actual transmissions caused by the apps) that detects when apps actually circumvent permissions.

One or more the apps in the list 170 may be reverse engineered to determine how they were able to circumvent the permissions system. The reverse engineering process may involve decompiling the app (e.g., using a tool such as apktool or IdaPro) and extracting the decompiled code (e.g., smali bytecode or assembly). The code can then be analyzed for the presence of strings containing permission-protected data and to determine where in the code the data was created and from which data source the data was obtained. In one embodiment, the reverse engineering process may involve searching the code for strings corresponding to destinations for the network transmissions and other aspects of the packets. This may help reveal where the data was already in memory. Static analysis of the code may then reveal where that data first gets populated. Intentionally obfuscated code is more complicated to reverse engineer. Thus, in one embodiment, logging statements may be added for data and stack traces as new bytecode throughout the decompiled code. This code may then be recompiled and executed dynamically to get a better insight into how it works. The reverse engineering process may access and use the platform activity log 145 and/or the kernel activity log 150 stored in the database 130 to better understand the runtime behavior of apps, which can help with the reverse engineering process.

The reverse engineering process may reveal malicious code in the app. For example, it has been found through reverse engineering that apps can obtain the MAC addresses of the connected WiFi base stations from the address resolution protocol (ARP) cache. This can be used as a surrogate for location data. Also, it has been found through reverse engineering that apps can obtain the device MAC address using ioctl system calls. Also, it has been found through reverse engineering that apps may make use of the secure digital (SD) card as a covert channel so that an app that has permission to read the device's IMEI stores the IMEI in the SD card so that other apps, which do not have permission to access the device's IMEI (but have permission to access external storage), can access it. Also, it has been found through reverse engineering that apps can use picture metadata as a side channel to access precise location information despite not having any location permissions.

In one embodiment, the permission circumvention detector 160 groups the permission-circumvented data based on a combination of data type and data destination (type-data pair). It has been found that the same data type and destination pair usually reflects the use of the same side/covert channel. The permission circumvention detector 160 may then select one application per group (as representative apps) and generate a report of the representative apps, which may be provided to the system operator. The representative apps may be reverse engineered to determine how they were able to access permission-protected data without having the requisite permissions. This may help with reducing the number of apps that need to be reverse engineered. Transmission of permission-protected data may be caused by different apps using the same SDK code so it may be sufficient to reverse engineer just one of the apps that uses the SDK code without having to reverse engineer all of the apps that use the SDK code.

In one embodiment, once the reverse engineering process identifies the malicious code (e.g., the code that caused permission-circumvented data to be accessed/transmitted without the requisite permission), a fingerprint is crafted that can be used to identify the presence of the exploit. Preferably, the fingerprint is crafted to identify the exploit while also being robust against false positives. For example, a fingerprint may be a specific string constant used by the malicious code (e.g., corresponding to a fixed encryption key used by an app or SDK) or a specific error message (e.g., a specific error message produced by another SDK if the operation fails). The fingerprints may then be provided to the permission circumvention detector 160.

The permission circumvention detector 160 may use static analysis to identify apps having code that includes any of the fingerprints. For example, the permission circumvention detector 160 may decompile apps and search for the presence of any fingerprints (e.g., a particular string) in the decompiled code (in some cases the path and name of the file is also used as matching criteria to protect against false positives). The apps having code that includes a fingerprint are apps that are considered to have the capability of circumventing permissions (e.g., this fingerprint based on static analysis may be used to identify apps that were not identified during dynamic analysis (e.g., because the app had the requisite permission or the user interaction simulator 113 did not explore that code branch). The permission circumvention detector 160 may then generate a report of the list of these apps (e.g., list 180 shown in the diagram), which may be provided to the system operator.

Thus, embodiments may perform dynamic analysis to identify apps that cause permission-protected data to be transmitted without having the requisite permissions, as well as perform static analysis to identify apps that are capable of circumventing permissions. In some cases both types of analysis (dynamic and static) may be performed, while in other cases only one of dynamic and static analysis may need to be performed (e.g., dynamic analysis may not be needed for an app if there is already an existing fingerprint match on the app). A technical benefit of the technique described herein is that it can be used to automatically identify apps that circumvent permissions or have the capability of circumventing preventions at scale (e.g., multiple apps can be tested for permission circumvention simultaneously with little manual effort). Also, since embodiments perform dynamic analysis that analyzes actual traffic, there are fewer false positives (e.g., compared to existing solutions that rely on static analysis).

While embodiments have been described primarily in the context of apps executing on mobile devices hosting mobile operating systems, it should be understood that the techniques described herein are not limited to that context. For example, the techniques described herein can also be applied in a context of applications executing on other types of computing devices (e.g., non-mobile computing devices such as desktops, servers, etc. hosting desktop/server operating systems such as macOS® and Windows®). More generally, the techniques described herein can be applied in a context where there is access to the executable/code of applications, there is access to the list of permissions declared for the applications, and network traffic can be monitored. Also, while a certain arrangement of components is shown in the diagram, it should be understood that the arrangement is provided as an example, and that other embodiments may implement the same or similar functionality using a different arrangement and/or distribute functionality across components in a manner that is different than shown in the diagram.

In one embodiment, the permission circumvention detector 160 identifies apps that potentially obfuscate permission-protected data based on identifying apps that access permission-protected data (e.g., based on inspecting platform activity log 145 and/or kernel activity log 150) but not observing the permission-protected data in the network traffic (e.g., based on inspecting the network traffic log 140). This could be performed, for example, by taking the set of apps that access permission-protected data and excluding ("set minus") apps that cause that permission-protected data to be transmitted (which results in apps that weren't observed by the system as causing permission-protected data to be transmitted but which accessed it, and thus are potentially using obfuscation). The permission circumvention detector 160 may then generate a report indicating the apps that were identified as potentially obfuscating permission-protected data (which may be provided to the system operator). Such apps may be of interest because they may be causing network traffic to be transmitted in ways that the system was not able to detect. These apps can be reverse engineered to determine how they are obfuscating data. It can then be determined, based on this, how to de-obfuscate such obfuscated data, which the system can use to de-obfuscate future network traffic.

Figure 2:
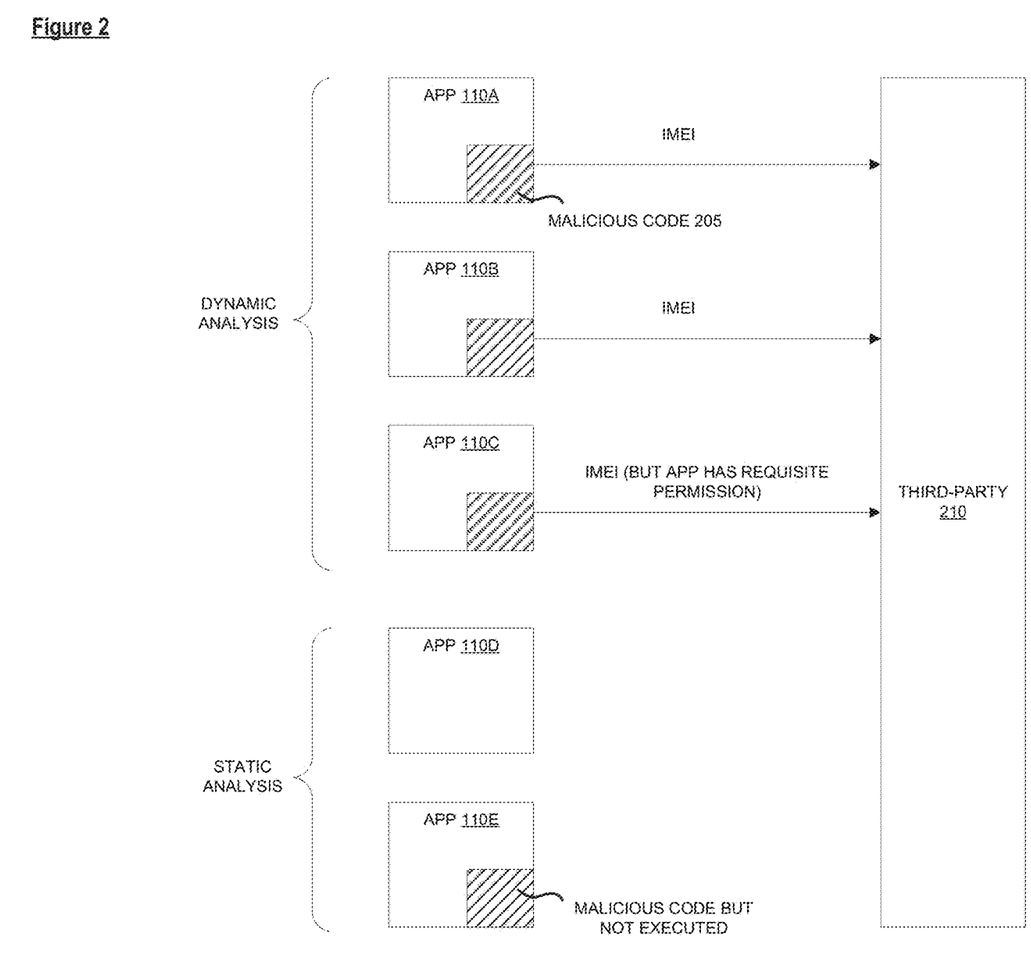
FIG. 2 is a diagram illustrating the use of dynamic analysis and static analysis to identify apps that circumvent permissions, according to some embodiments.

FIG. 2 is a diagram illustrating the use of dynamic analysis and static analysis to identify apps that circumvent permissions, according to some embodiments. As shown in the diagram, apps 110A-C transmit the IMEI to a third-party 210. The system may detect, based on performing dynamic analysis, that apps 110A and 110B transmitted the IMEI to the third-party 210 without having the requisite permission to access the IMEI (e.g., without having the READ_PHONE_STATE permission). The dynamic analysis may also determine that while app 110C transmits the IMEI it is not circumventing permissions since it has the requisite permission to access the IMEI. The dynamic analysis may also determine that apps 110D and 110E are not circumventing permissions because they do not transmit the IMEI.

Based on app 110A being identified as circumventing permissions, app 110A may be reverse engineered to determine the part of the code that is responsible for accessing the IMEI (this code is referred to as the "malicious code" 205). A fingerprint that is unique to the malicious code 205 may be generated and provided to the system. The system may then perform static analysis that searches for the presence of the fingerprint in the code of the other apps. If the fingerprint is found in the code, the app is flagged as being capable of circumventing permissions. In this example, the fingerprint is not found in the code of app 110D, and thus app 110D is not flagged as being capable of circumventing permissions. Also, in this example, the fingerprint is found in app 110B and app 110C (and this may explain how those apps accessed the IMEI and caused the IMEI to be transmitted to the third-party 210). Also, the fingerprint is found in the code of app 110E (because it has the same malicious code as app 110A), and thus the static analysis may flag app 110E as being capable of circumventing permissions even though app 110E did not transmit the IMEI.

FIG. 3A is a diagram illustrating a covert channel, according to some embodiments. As shown in the diagram, a security mechanism allows "app1" access to resources but denies "app2" access. This is circumvented by "app2" using "app1" as a facade to obtain access over a communication channel not monitored by the security mechanism (the covert channel).

FIG. 3B is a diagram illustrating a side channel, according to some embodiments. As shown in the diagram, a security mechanism denies "app1" access to resources. This is circumvented by accessing the resources through a side channel that bypasses the security mechanism. The techniques described herein may be used to identify apps that cause permission-protected data to be transmitted without having the requisite permission, which is strong evidence that those apps are using side channels and/or covert channels. A reverse engineering process may be applied to those apps to determine the specific side/covert channels used.

Figure 4:
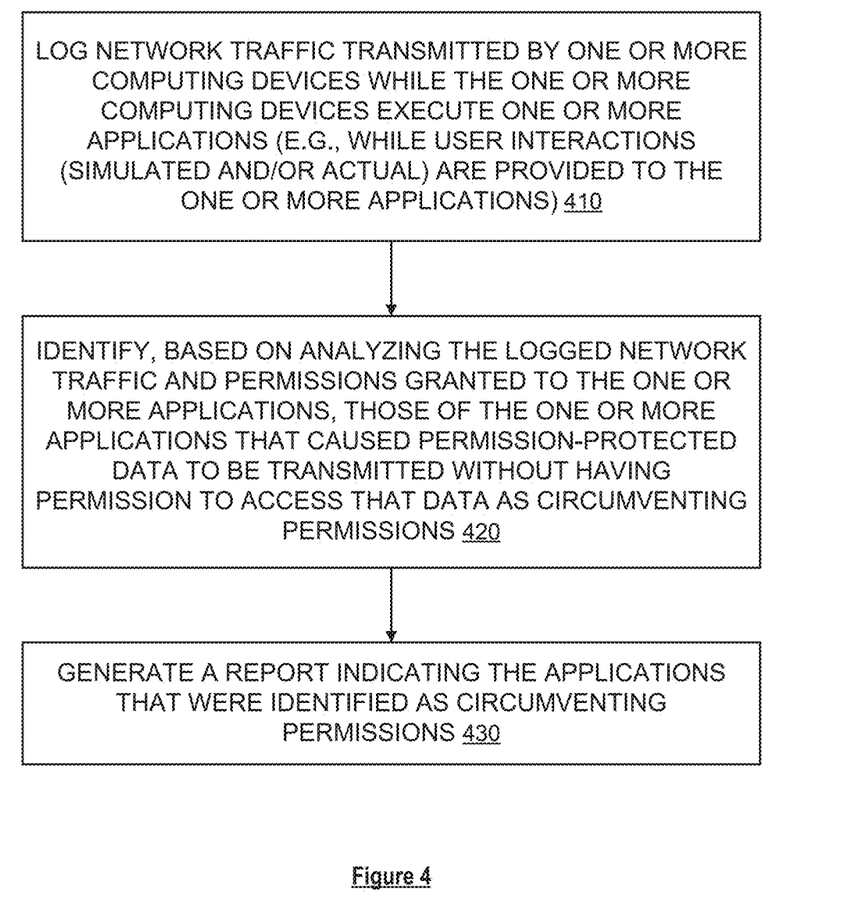
FIG. 4 is a flow diagram of a process for automatically identifying applications that circumvent permissions, according to some embodiments.

FIG. 4 is a flow diagram of a process for automatically identifying applications that circumvent permissions, according to some embodiments. In one embodiment, the process is implemented by a system such as the system shown in FIG. 1. The process may be implemented using any combination of hardware, software, and firmware. The operations in the flow diagram are described with reference to the exemplary embodiments of the other diagrams. However, it should be understood that the operations of the flow diagram can be performed by embodiments of the invention other than those discussed with reference to these other diagrams, and the embodiments of the invention discussed with reference to these other diagrams can perform operations different than those discussed with reference to the flow diagram. Also, while the flow diagram shows a particular order of operations performed by certain embodiments, it should be understood that such order is provided by way of example (e.g., alternative embodiments may perform the operations in a different order, combine certain operations, overlap certain operations, etc.).

At block 410, the system (e.g., the network traffic logger 115 of the system) logs network traffic transmitted by one or more computing devices (e.g., mobile devices) while the one or more computing devices execute one or more applications (e.g., apps). The network traffic may be logged while user interactions are provided to the one or more applications. In one embodiment, the network traffic is logged while user interactions are being simulated (e.g., by the user interaction simulator 113) on at least one of the one or more applications. Additionally or alternatively, the network traffic is logged while user interactions are provided by an actual human user (e.g., by directly interacting with the application in-person or interacting with the application remotely using a remote desktop tool) on at least one of the one or more applications. In one embodiment, the network traffic is logged based on redirecting, using a VPN API, network traffic to a localhost service that inspects network traffic using deep packet inspection in user space. In one embodiment, the network traffic is logged based on performing TLS interception using a root certificate is installed in a system trusted certificate store. In one embodiment, each of the one or more applications is executed on an instrumented version of a mobile operating system that logs application execution information. For example, the mobile operating system may be instrumented at a platform level to log information regarding one or more of: resource access (e.g., file access) by applications, when applications are installed and executed, and network traffic and/or instrumented at a kernel level to log information regarding one or more of: resource access (e.g., file access) by applications, when applications are installed and executed, and network traffic.

At block 420, the system (e.g., the permission circumvention detector 160 of the system) identifies, based on analyzing the logged network traffic and permissions granted to the one or more applications, those of the one or more applications that caused permission-protected data to be transmitted without having permission to access that data as circumventing permissions. In one embodiment, the permission-protected data includes one or more of: an IMEI of a computing device, a MAC address of a computing device, a MAC address of a router connected to a computing device, and a geolocation of a computing device. In one embodiment, identifying those of the one or more applications that circumvent permissions is based on identifying, based on inspecting the logged network traffic, permission-protected data caused to be transmitted by the one or more applications, excluding, from the identified permission-protected data, data caused to be transmitted by an application that has permission to access that data to generate permission-circumvented data, and identifying those of the one or more application that caused the permission-circumvented data to be transmitted.

At block 430, the system (e.g., the permission circumvention detector 160 of the system) generates a report indicating the applications that were identified as circumventing permissions (which may be provided to the system operator).

In one embodiment, the system (e.g., the permission circumvention detector 160 of the system) groups the permission-circumvented data based on a combination of data type and data destination, selects one of the one or more applications that caused data of a particular data type to be transmitted to a particular data destination to be a representative application for a combination of the particular data type and the particular data destination (the type-destination pair), and generates a report indicating that the selected application is the representative application for the combination of the particular data type and the particular data destination.

In one embodiment, the system (e.g., the permission circumvention detector 160 of the system) searches for a fingerprint in code of at least one of the one or more applications, where the fingerprint is text that has determined to be used in code of an application that circumvents permissions (e.g., the fingerprint may have been generated from malicious code discovered as part of a reverse engineering process), identifies those of the at least one of the one or more applications that include the fingerprint in its code as capable of circumventing permissions, and generates a report indicating the applications that were identified as capable of circumventing permissions.

In one embodiment, the system (e.g., the permission circumvention detector 160 of the system) identifies those of the one or more applications that accessed permission-protected data but were not found causing the accessed permission-protected data to be transmitted as potentially obfuscating data and generates a report indicating the applications that were identified as potentially obfuscating data (which may be provided to the system operator).

Figure 5:
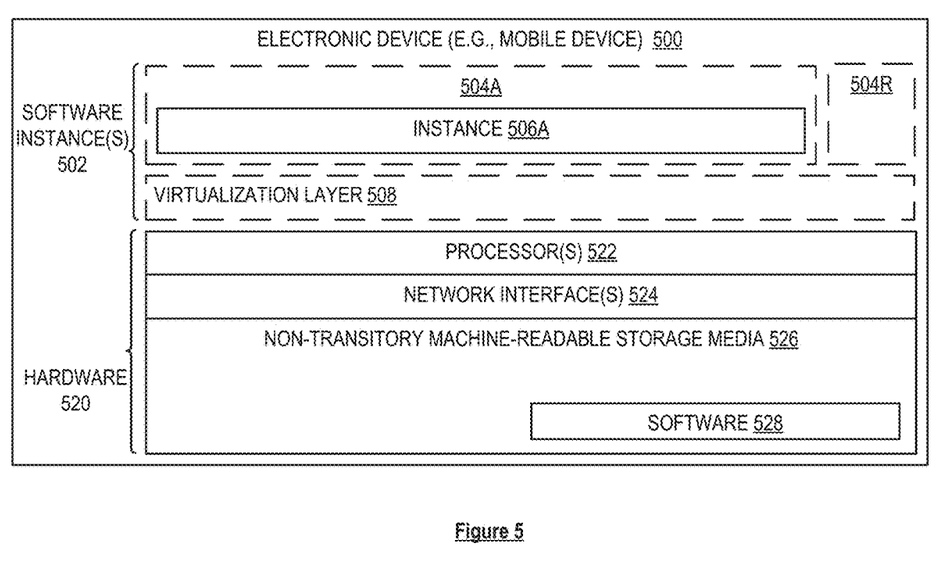
FIG. 5 is a block diagram illustrating an electronic device, according to some embodiments.

FIG. 5 is a block diagram illustrating an electronic device (e.g., a mobile device), according to some embodiments. FIG. 5 illustrates hardware 520 comprising a set of one or more processor(s) 522, a set of one or more network interfaces 524 (wireless and/or wired), and non-transitory machine-readable storage medium/media 526 having stored therein software 528 (which includes instructions executable by the set of one or more processor(s) 522). Software 528 can include code, which when executed by hardware 520, causes the electronic device 500 to perform operations of one or more embodiments described herein (e.g., operations for identifying applications that circumvent permissions and/or operations for identifying applications that potentially obfuscate data). In one embodiment, the electronic device 500 is a mobile device that implements a user interaction simulator 113 and a network traffic logger 115 (and possibly platform-level instrumentation 120 and/or kernel-level instrumentation 125). In one embodiment, the electronic device 500 implements a permission circumvention detector 160.

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by a computer-implemented system to automatically identify applications that circumvent permissions, the method comprising:

logging network traffic transmitted by one or more computing devices while the one or more computing devices execute one or more applications;

identifying, based on analyzing the logged network traffic and permissions granted to the one or more applications, those of the one or more applications that caused permission-protected data to be transmitted without having permission to access that data as circumventing permissions, wherein the permissions granted to the one or more applications include permissions for the one or more applications to access certain types of data stored in the one or more computing devices;

decompiling an application to generate decompiled code of the application;

searching for a fingerprint in the decompiled code of the application, wherein the fingerprint was generated based on reverse engineering one of the applications that were identified as circumventing permissions;

determining that the application is capable of circumventing permissions in response to finding the fingerprint in the decompiled code of the application; and generating a report indicating the applications that were identified as circumventing permissions and indicating that the application is capable of circumventing permissions.

2. The method of claim 1, wherein identifying those of the one or more applications that circumvent permissions is based on identifying, based on inspecting the logged network traffic, permission-protected data caused to be transmitted by the one or more applications, excluding, from the identified permission-protected data, data caused to be transmitted by an application that has permission to access that data to generate permission-circumvented data, and identifying those of the one or more application that caused the permission-circumvented data to be transmitted.

3. The method of claim 2, further comprising:
grouping the permission-circumvented data based on a combination of data type and data destination;
selecting one of the one or more applications that caused data of a particular data type to be transmitted to a particular data destination to be a representative application for a combination of the particular data type and the particular data destination; and
generating a report indicating that the selected application is the representative application for the combination of the particular data type and the particular data destination.

4. The method of claim 1,
wherein the fingerprint includes text that has determined to be used in code of the reverse engineered application.

5. The method of claim 1, wherein the permission-protected data includes one or more of: an international mobile equipment identity (IMEI) of a computing device, a media access control (MAC) address of a computing device, a MAC address of a router connected to a computing device, and a geolocation of a computing device.

6. The method of claim 1, wherein each of the one or more applications is executed on an instrumented version of a mobile operating system that logs application execution information.

7. The method of claim 6, wherein the mobile operating system is instrumented at a platform level to log information regarding one or more of: resource accesses by applications, when applications are installed and executed, and network traffic.

8. The method of claim 6, wherein the mobile operating system is instrumented at a kernel level to log information regarding one or more of: resource accesses by applications, when applications are installed and executed, and network traffic.

9. The method of claim 1, wherein the network traffic is logged while user interactions are being simulated on at least one of the one or more applications.

10. The method of claim 1, wherein the network traffic is logged while one or more users interact with at least one of the one or more applications directly in-person or remotely.

11. The method of claim 1, further comprising:
identifying those of the one or more applications that accessed permission-protected data but were not found causing the accessed permission-protected data to be transmitted as potentially obfuscating data; and
generating a report indicating the applications that were identified as potentially obfuscating data.

12. A set of one or more non-transitory machine-readable storage media storing instructions which, when executed by one or more processors of a set of computing devices, causes the set of computing devices to perform operations for identifying applications that circumvent permissions, the operations comprising:
accessing a network traffic log that includes information regarding network traffic transmitted by one or more computing devices while the one or more computing devices were executing one or more applications;
identifying, based on analyzing the network traffic log and permissions granted to the one or more applications, those of the one or more applications that caused permission-protected data to be transmitted without having permission to access that data as circumventing permissions, wherein the permissions granted to the one or more applications include permissions for the one or more applications to access certain types of data stored in the one or more computing devices;
decompiling an application to generate decompiled code of the application;
searching for a fingerprint in the decompiled code of the application, wherein the fingerprint was generated based on reverse engineering one of the applications that were identified as circumventing permissions;
determining that the application is capable of circumventing permissions in response to finding the fingerprint in the decompiled code of the application; and
generating a report indicating the applications that were identified as circumventing permissions and indicating that the application is capable of circumventing permissions.

13. The set of one or more non-transitory machine-readable storage media of claim 12, wherein identifying those of the one or more applications that circumvent permissions is based on identifying, based on inspecting the network traffic log, permission-protected data caused to be transmitted by the one or more applications, excluding, from the identified permission-protected data, data caused to be transmitted by an application that has permission to access that data to generate permission-circumvented data, and identifying those of the one or more application that caused the permission-circumvented data to be transmitted.

14. The set of one or more non-transitory machine-readable storage media of claim 13, wherein the operations further comprise:

grouping the permission-circumvented data based on a combination of data type and data destination;

selecting one of the one or more applications that caused data of a particular data type to be transmitted to a particular data destination to be a representative application for a combination of the particular data type and the particular data destination; and generating a report indicating that the selected application is the representative application for the combination of the particular data type and the particular data destination.

15. The set of one or more non-transitory machine-readable storage media of claim 12, wherein the fingerprint includes text that has determined to be used in code of the reverse engineered application.

16. The set of one or more non-transitory machine-readable storage media of claim 12, wherein the permission-protected data includes one or more of: an international mobile equipment identity (IMEI) of a computing device, a media access control (MAC) address of a computing device, a MAC address of a router connected to a computing device, and a geolocation of a computing device.

17. A computing device configured to identify applications that circumvent permissions, the computing device comprising:

one or more processors; and a non-transitory machine-readable storage medium having instructions stored therein, which when executed by the one or more processors, causes the computing device to:

access a network traffic log that includes information regarding network traffic transmitted by one or more computing devices while the one or more computing devices were executing one or more applications, identify, based on analyzing the network traffic log and permissions granted to the one or more applications, those of the one or more applications that caused permission-protected data to be transmitted without having permission to access that data as circumventing permissions, wherein the permissions granted to the one or more applications include permissions for the one or more applications to access certain types of data stored in the one or more computing devices, decompile an application to generate decompiled code of the application, search for a fingerprint in the decompiled code of the application, wherein the fingerprint was generated based on reverse engineering one of the applications that were identified as circumventing permissions, determine that the application is capable of circumventing permissions in response to finding the fingerprint in the decompiled code of the application, and generate a report indicating the applications that were identified as circumventing permissions and indicating that the application is capable of circumventing permissions.

18. The computing device of claim 17, wherein identifying those of the one or more applications that circumvent permissions is based on identifying, based on inspecting the network traffic log, permission-protected data caused to be transmitted by the one or more applications, excluding, from the identified permission-protected data, data caused to be transmitted by an application that has permission to access that data to generate permission-circumvented data, and identifying those of the one or more application that caused the permission-circumvented data to be transmitted.

19. The computing device of claim 18, wherein the instructions, when executed by the one or more processors, further causes the computing device to:

group the permission-circumvented data based on a combination of data type and data destination, select one of the one or more applications that caused data of a particular data type to be transmitted to a particular data destination to be a representative application for a combination of the particular data type and the particular data destination, and generate a report indicating that the selected application is the representative application for the combination of the particular data type and the particular data destination.

20. The computing device of claim 17, wherein the fingerprint includes text that has determined to be used in code of the reverse engineered application.

* * * * *